Nov. 17, 1925.                                                1,562,227
H. GOLDSCHMIDT
METHOD OF WELDING METALS
Filed Sept. 2, 1921

Inventor
Hans Goldschmidt
By
Edgar F. Baumgartner Attorney

Patented Nov. 17, 1925.

1,562,227

UNITED STATES PATENT OFFICE.

HANS GOLDSCHMIDT, OF BERLIN, GERMANY, ASSIGNOR TO GESELLSCHAFT FÜR ALUMINOTHERMIE, M. B. H., DR. HANS GOLDSCHMIDT, OF BERLIN, GERMANY.

METHOD OF WELDING METALS.

Application filed September 2, 1921. Serial No. 497,996.

*To all whom it may concern:*

Be it known that I, HANS GOLDSCHMIDT, a citizen of Germany, and a resident of Berlin, Germany, have invented certain new and useful Improvements in Methods of Welding Metals (for which applications have been filed in Germany April 9th, 1921, July 16th, 1921, and in Italy January 5th, 1922), of which the following is a specification.

This invention relates to a method of welding metal bars by the fusion of iron by the thermo-aluminic process.

Heretofore it has been proposed to bring the ends of the metal bars to welding heat by means of the reacting thermo-aluminic mixture e. g. thermit and to effect the welding by mechanical pressure or in like manner. The fused metal has also been used to unite parts of the profile or side surfaces of the metal bars by causing it to flow around the same and thus strengthen the joint. It is also known to unite the ends of metal bars, particularly in the case of street car rails by moulding the metal around the same or by pouring it into the joint. For this purpose the ends of the rails are set at a distance of from fifteen to twenty-five millimeters apart, enclosed in a mould which is heated, whereupon the fused metal is poured into the mould. The rails are thus completely softened and re-fused by the molten iron. This method also involves the use of considerable quantities of the thermo-aluminic mixture even when twenty-five to fifty per cent of preheated iron shot is added to the mixture. It is found that approximately nine to thirteen kilograms of thermo-aluminic mixture are required for each rail joint.

The object of the present invention is to reduce the consumption of the thermo-aluminic mixture as much as possible.

According to the present invention, the end faces of the metal bars are brought into close proximity, the gap or distance between the faces to be joined being reduced to about one fifth to one tenth of the distance between the faces heretofore usual. The joint is enclosed in a mould such that the protuberances at the joint are reduced to a minimum. The consequent reduction of the welding surface necessitates preheating of the ends or surfaces of the parts to be joined to as high a temperature as possible and the process therefore consists in preheating the parts to be joined, e. g. the ends of the rails to as high a temperature as possible within the mould and pouring the molten iron into the joint and mould.

It is desirable to employ a thermo-aluminic mixture having as high thermo-aluminic properties as possible, that is to say, a thermo-aluminic mixture to which little or no additional iron has been added.

By this method the end faces of the rails or metal bars are brought to approximately welding temperature so that they are immediately united by the highly heated fused iron, the latter solidifying at the welding temperature.

The economy in the thermo-aluminic mixture is very considerable, as it has been found that the quantity of mixture can be reduced to approximately one third or one fourth of that previously required. The rails can either be firmly embedded in carrying out this process or, where possible, they may be clamped by means of a suitable clamping device. The surface of the rails is not appreciably softened by the fused iron and consequently a much firmer and permanent weld is obtained.

In order to reduce the consumption of the thermo-aluminic mixture as far as possible, it is desirable to preheat as little as possible of the rail or bar and to confine the welding almost entirely to the joint faces, i. e. the surfaces to be joined. In the known processes a considerable part of the rails on each side of the joint is highly heated which not only involves an unnecessary consumption of the thermo-aluminic mixture, but also gives rise to internal strains in the rails.

It is therefore preferable, according to the present invention, to highly heat the joint without at the same time heating the portion of the rails or other parts to be joined adjacent to the joint. It is not possible, however, to effect the preheating of the joint i. e. the surfaces to be joined in a very small mould, for the reason that sufficient space is not afforded for the expansion of the gases. Moreover the preheating would occupy considerable time and consume a large quantity of liquid fuel such as benzol and the like.

It is therefore desirable to surround the joint with a mould or chamber of sufficient dimensions to obtain efficient preheating of the ends of the rails or other surfaces to be joined. This has the advantage also that the same mould can be repeatedly used. The mould may be either of clay, cast iron, cast steel, or metal plate having a refractory lining such as asbestos or of any other suitable material.

It has been found for example that to sufficiently preheat an ordinary street car rail approximately one kilogram of benzol is required and the preheating is completed in about twenty to thirty-five minutes according to the size of the rail.

After the rail ends have been heated in the preheating mould, the joint is preferably enclosed in a welding mould of similar size to that of the parts to be joined and which may be formed from any suitable plastic material which is placed over the preheating mould and dried by the waste gases therefrom. This method avoids the necessity of a furnace heretofore required for drying the mould.

The changing of the moulds can be effected very rapidly so that very little heat is lost.

Although a certain amount of the molten metal overflows the joint, the amount is so small that the portions of the rails adjoining the ends are only heated to a slight extent.

It is not essential however that the metal forming the joint should all be introduced into the joint by pouring. The head of the rail may be butt-welded by inserting in the joint a plate of any desired thickness, for example, from one half to six millimeters in thickness and then preheating the joint in a preheating mould as already described. The welding mould is then formed at the top of the rail so that it contains the whole of the slag whilst the welding by means of the fused iron reaches from the foot and web of the rail to the top thereof. The economy in thermo-aluminic mixture is therefore ensured by the utilization of the slag. The ends of the rails are thus formed with an overflowing welded joint of fused iron at the foot, web, and up to the head of the rail without the end portions of the rails adjacent to the joint being overheated, so that the possibility of cracks due to shrinkage or other breakages is obviated.

It is also possible to dispense with the intermediate plate in the joint and to produce a slight overlap of fused iron, thus forming a slight strengthening of the butt joint, the strengthening extending over a breadth of about twenty to twenty-five millimeters and being a thickness of from five to fifteen millimeters. This quantity of fused iron is sufficient to bring the welding surface to welding temperature when the rails are sufficiently preheated.

The two moulds may also be used to produce a true butt weld, without any protuberances, by emptying the crucible from above instead of opening the crucible below. In this case the slag will first of all be decanted and the molten iron flowing thereafter will not come in direct contact with the rails. In this case also the joint is previously heated in a larger mould and the casting of the weld is effected in a mould of smaller dimensions.

The joint may also be produced by hard soldering by inserting, for example, a copper plate or a copper plated metal sheet or a sheet of hard solder in the joint across the entire end faces of the rails in which case still less thermo-aluminic mixture is required.

Finally the method can be still further simplified by dispensing with the use of a crucible and utilizing a so-called "sinterthermit." In this case also the preheating is effected in a preheating mould and the reaction with the "sinterthermit" is effected in a second or welding mould.

In order to render the above disclosure of my invention more understandable, I have shown in the accompanying drawing examples of devices that may be used for the purpose of carrying out my process:

Figure 1:
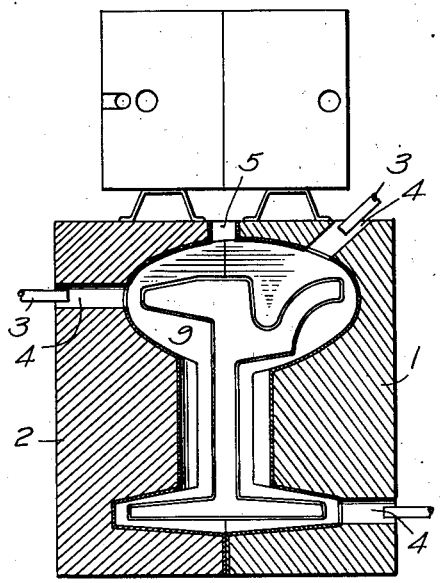
Figure 1 shows in cross-section the preheating mold and the casting mold in position to be heated, in apparatus for the practice of my invention.
Figure 2:
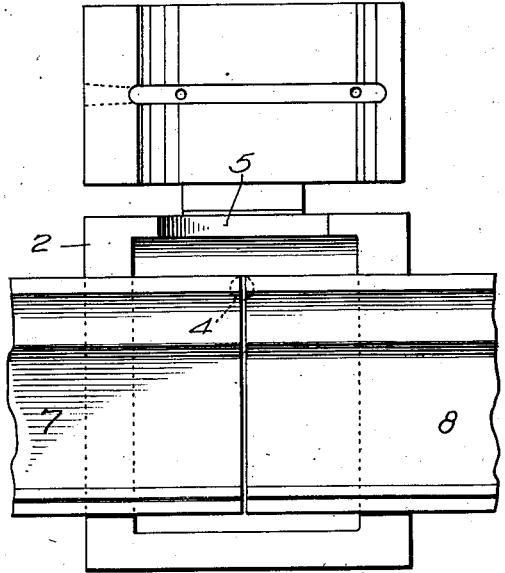
Fig. 2 is a view taken from the right side of Fig. 1 with the parts of the preheating and casting molds toward the observer removed.

Referring to Fig. 1 the preheating mold comprises two parts 1 and 2, that are positioned on opposite sides of the ends of the members to be joined. This mold has a large enough interior space to permit a free circulation of heating medium, for example, blast flames, introduced by nozzles 3 through the openings 4. The number of the said openings and nozzles to be provided in connection with the preheating mold is determined by the known practice in the art, and forms no part of this invention. The waste gases pass through a properly positioned outlet 5 and are utilized to heat and dry the casting mold 6, which is supported over the outlet of the preheating mold. When the ends of the parts to be joined, for example, the rails 7 and 8, are in such close proximity as shown in Fig. 2, the space 9 within the preheating mold must be made so large by spacing the interior walls of the preheating mold at considerable distance from the rails, that the formation of a joint by casting metal without bringing the surfaces that confine the metal during the pouring, closer to the rails, would be extremely expensive.

Figure 5:
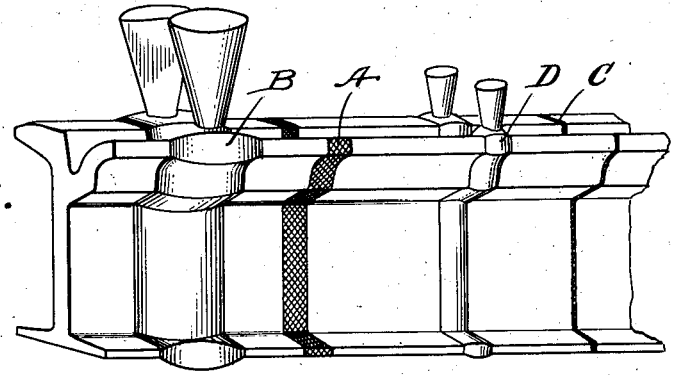
Fig. 5 illustrates the joint produced by the best known old practice and the joint produced in accordance with my invention.
Figure 3:
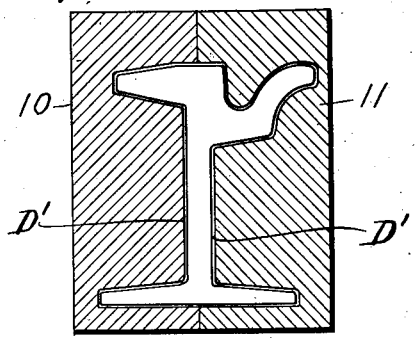
Fig. 3 is a cross-sectional view of the casting mold in place.
Figure 4:
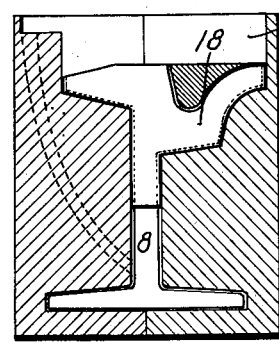
Fig. 4 shows a modified form of casting mold.

The surfaces confining the metal during the casting operation may be made to lie in very close proximity to the edges of the surfaces to be welded by various methods, and in Fig. 3, I have shown a casting mold which may be clamped upon the rails immediately upon the removal of the preheating mold, and which comprises two parts 10 and 11 that are provided with small spaces D' for the molten metal, the spaces D' being of such size that the ends of the parts to be joined extend into the chamber formed thereby. The mold parts are held together by any suitable clamping means, which are well known in this art. Pouring may be done through a gate or other risers formed in the mold parts in accordance with known practice. If an insert or welding plate is placed between the surfaces to be joined the slag may be collected and held at the top of the casting mold in order that the heat contained therein may be utilized to insure that the insert 18 will be properly welded to the cast metal and to the rails. In Fig. 4 a form of mold for carrying out such an operation is shown wherein the space 20 will collect the slag.

Where the preheating was effected in the casting mold, it was necessary to leave a large gap A (Fig. 5) between the ends of the parts to be joined and it was necessary to have the surfaces that confine the cast metal in the joint spaced so far from the edges of the surfaces to be joined that the uneconomical protuberance of metal B and large gates and risers are necessary. A weld made in accordance with my invention, however, permits the surfaces to be joined to be placed very close together, since the space within the preheating mold is large. A short space is indicated at C. The small size of the protuberance of metal D that results from forming a joint in accordance with my invention is due to the fact that the inner surfaces of the mold are in closer proximity to the parts to be welded than is possible where the preheating must be done in the casting mold. Although these exemplary devices for use in carrying out my process have been shown and described in some detail, I do not intend that my invention shall be limited to the use thereof but that it shall be defined by the hereunto appended claims.

Claims:

1. A method of welding metal parts by the thermo-aluminic process which consists in bringing faces of the metal parts into close proximity, preheating said faces to substantially welding temperature, enclosing the joint in a mould and introducing the molten metal into said joint and mould, the mould closely conforming to the profile of the metal parts and being of such reduced dimensions that the preheated portions of the metal parts extend beyond the metal space within said mould, whereby the outer preheated portions are not further heated by the molten metal.

2. The method of uniting metal parts by the thermo-aluminic process which consists in first preheating the surfaces to be joined to substantially welding temperature, bringing said surfaces into close proximity, and then introducing the thermo-aluminic metal between said surfaces and confining the introduced metal while in a molten state to substantially the space between said faces.

3. The method of uniting metal parts by welding which consists in first preheating the surfaces thereof to be joined to substantially welding temperature and then introducing between said surfaces while in close proximity molten metal similar in character to that of the parts to be joined and confining said introduced metal while in molten state to substantially the space between said surfaces.

4. The method of uniting metal parts by the thermo-aluminic process which consists in preheating the surfaces to be joined to substantially welding temperature, bringing said surfaces into close proximity and positioning a solid metal part between said surfaces and then placing around said surfaces a mould which engages said parts and extends in close proximity to the edges of said surfaces and introducing the molten metal into said mould and collecting and retaining the slag on top of the cast metal whereby the heat of said slag is available to assist in the welding operation.

In testimony whereof I hereunto affix my signature.

HANS GOLDSCHMIDT.